June 14, 1949.  L. C. CARLSON  2,473,051
ADAPTER
Filed Jan. 17, 1945
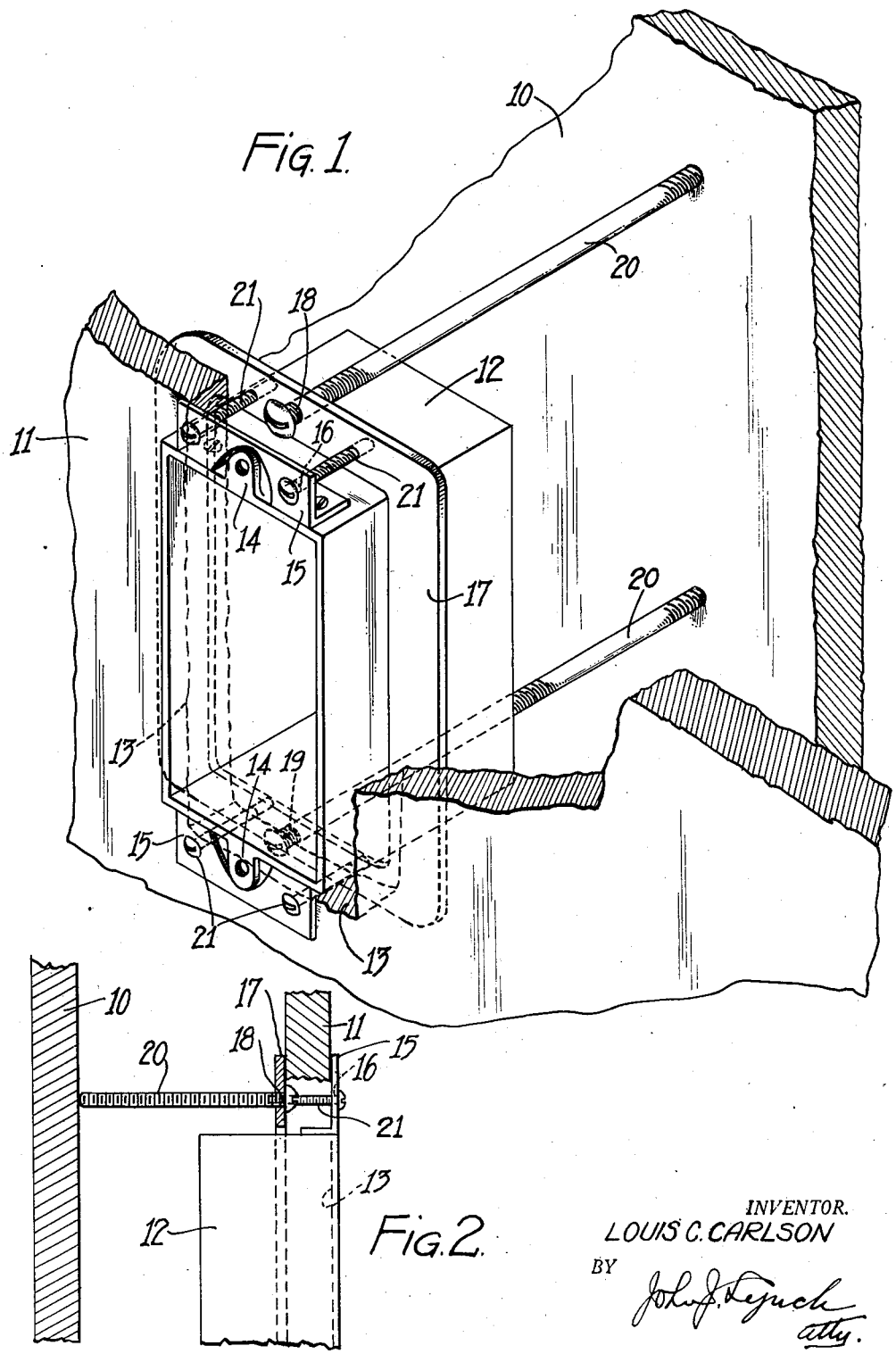
INVENTOR.
LOUIS C. CARLSON
BY Patented June 14, 1949

2,473,051

UNITED STATES PATENT OFFICE 2,473,051

ADAPTER

Louis C. Carlson, South Ozone Park, N. Y.

Application January 17, 1945, Serial No. 573,283

5 Claims. (Cl. 248—205)

This invention relates to adapters and in particular to one that can be positioned between walls to hold a device in a wall opening.

In the electrical and building trades it is necessary to position in wall openings, the connection or junction boxes used in lighting or to place in or on the walls, various receptacles as thermostats for the remote control of heating equipment and in order to place these containers on walls or within walls so that the receptacles can be connected internally and be accessible from the outside, it is necessary to cut suitable holes in the wall itself and in the case of plaster or wall board or other building materials, the hole is not of close dimensions and is probably irregular and jagged and presents a problem in mounting in the opening, the boxes referred to.

It is an important object of my invention to provide an adapter that can be readily put in position within a wall with a minimum of holding effort on the part of the mechanic, that can be quickly applied to any opening; that will firmly and securely hold the box in position and one which will fully comply with fire law regulations.

A still further object of the invention is to produce a simple holding element that can be applied to any opening, that will not depend upon the edges of the opening for support, will be held in position so that the box can be accurately placed and from which the box can be completely removed for repair, replacement or other adjustment without necessitating removal of the adapter.

While my invention finds its most useful application in mounting of outlet boxes and thermostats, it is evident that it can be used for the mounting of any instrument, or device that requires connection to another device through the space between walls and in which the fixing of a support member must be done in a confined and practically inaccessible space between walls.

With these and other objects in view, the invention comprises certain constructions hereinafter described and then particularly pointed out in the claims and a preferred embodiment of my invention is illustrated in the accompanying drawing, in which:

Figure 1 is a view in perspective showing the mounting of a box within a wall and illustrating the use of the adapter for the purpose of the invention, and Figure 2 is an enlarged fragmentary view in sectional elevation of the upper portion of the mounting illustrated in Figure 1 showing the relative arrangement of the supporting frame and box.

Referring to the drawing in detail, 10 indicates the rear wall and 11 the front wall, in the latter of which it may be desired to mount an electrical outlet box or other receptacle indicated as at 12 and arranged to fit into a hole 13 cut in the front wall 11.

The electrical connection box 12 used as an example, is of the usual shape and along its front upper and lower edges is provided with an integral tab 14 through the medium of which a cover plate may be secured to the box, and also a bracket 15 having spaced screw holes 16 for the purpose of mounting the box on the adapter 17 which consists of a rectangular frame of any desirable shape or dimensions. It is understood that a multiple box or receptacle can be mounted as well as a single box and in this event, the adapter would be made accordingly and to fit the hole.

The adapter consists of a single rectangular frame piece of flat metal or other suitable material having in its upper and lower reaches the threaded bores 18 and 19 respectively which receive threaded screws 20 that are first cut off to the proper dimension so that they can be threaded through the adapter 17 until they press against the rear wall and jam the frame 17 forcefully against the rear face of the front wall 11. When the adapter has been properly placed with respect to the opening 13, it forms a peripheral frame about the opening and through it may be inserted the box to be supported thereon by the screws 21 which thread through the screw holes 16 in the upper and lower tabs 15 that are attached to the box 12. These brackets or tabs 15 engage the outer surface of the front wall and the box is held securely in place over the upper and lower edges of the hole which is later covered by a suitable cover plate, not shown. If desired the wall engaging face of the frame 17 may be knurled or otherwise roughened to provide a wall gripping surface so that the pressure of the plate against the wall will prevent any loosening or turning thereof.

It is evident therefore that I have provided an improved and novel adapter that is inexpensive to manufacture, is rigid at all times, permits the ready insertion of the box into the wall opening and can itself be placed in position with a minimum of effort and time. Also my adapter permits the ready removal of the box for repair or replacement and lends itself to production in any shape or size required.

My invention is not to be restricted to the precise details of construction shown since various changes and modifications may be made therein without departing from the scope of the invention or sacrificing the advantages derived from its use.

What I claim is:

1. An adapter for mounting a device in an opening in a front wall accessible from the exterior only comprising a flat frame of rectangular form conforming in shape substantially to said opening and having a central opening for a receptacle and having upper and lower threaded bores therein, screws passing through said bores and engaging a spaced rear wall to jam the frame against the inner surface of the front wall in register with said opening at the top and bottom thereof, and means for attaching to said frame a receptacle to be supported in said wall and receptacle openings.

2. An adapter for use in a relatively inaccessible space between spaced front and rear walls comprising a frame plate of rectangular shape to be positioned about an opening in the front wall, screws passing through the opposite ends of said plate and engageable with the rear wall at two points to jam the plate evenly against the front wall and about said opening and means for attaching a member to be mounted in said opening to said frame plate.

3. An adapter for use in a relatively inaccessible space between the opposed faces of front and rear spaced walls comprising a flat frame plate having a central opening therein for register with a hole in said front wall, threaded bores at opposite edges of said plate, screws threaded through said bores and arranged to extend to the rear wall to engage a wall at spaced points to jam a flat side of the frame evenly against said front wall to hold the frame in position, about the hole in said front wall, and means for attaching a member to be positioned in said hole to said frame.

4. An adapter for use in a relatively inaccessible space between the opposed faces of a front and a rear wall, in the former of which an opening is provided, comprising a flat rectangular frame piece shaped to conform to said opening and fit about a receptacle inserted in said wall opening, threaded bores in the inner margin of said frame piece at opposite sides thereof, threaded shank screws extending through said bores to engage the rear wall at spaced points and jam the frame against the inner surface of said front wall in register with said wall opening, and means for securing said frame and a member to be supported in the wall opening, together.

5. An adapter for mounting a device in an opening of one of spaced walls which are accessible from the exterior comprising a rectangular frame having a central opening therein and threaded openings at the opposite ends thereof, said frame being arranged for abutting relation with the wall in which said opening appears and extending about said opening, jamming screws in said end openings for adjustment against the wall opposite the hole for jamming the frame into position about said opening, and means for mounting a hole closing member in said frame.

LOUIS C. CARLSON.

REFERENCES CITED

The following references are of record in the file of this patent:

UNITED STATES PATENTS

| Number | Name | Date |
|---|---|---|
| 1,453,017 | Lindelof | Apr. 24, 1923 |
| 2,264,485 | Smith | Dec. 2, 1941 |